May 14, 1929.  E. ERIKSEN ET AL  1,713,220
PLURAL ROW CINEMATOGRAPHIC CAMERA
Filed Oct. 1, 1924   2 Sheets-Sheet 2
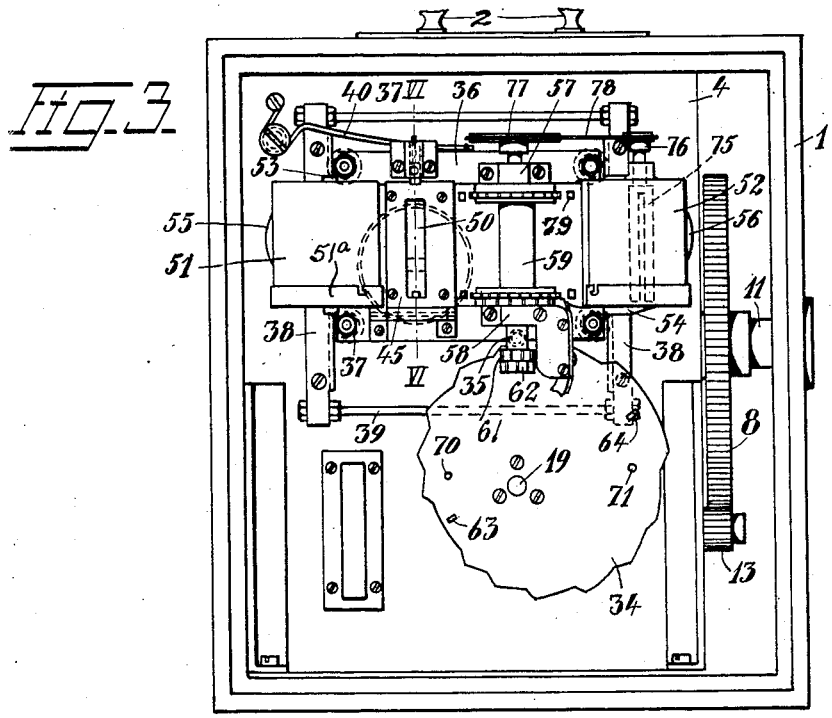
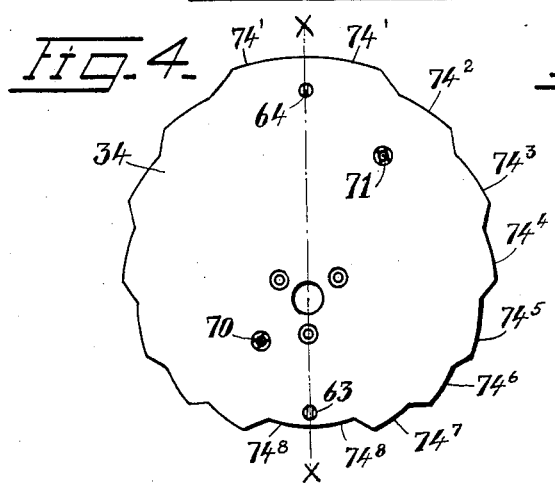
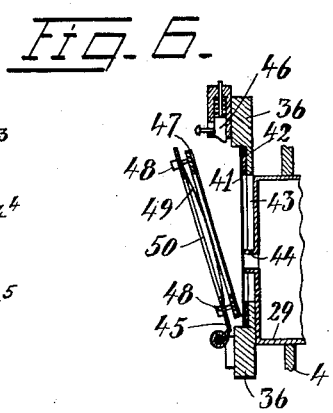
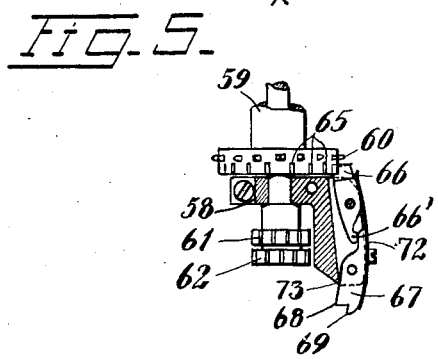
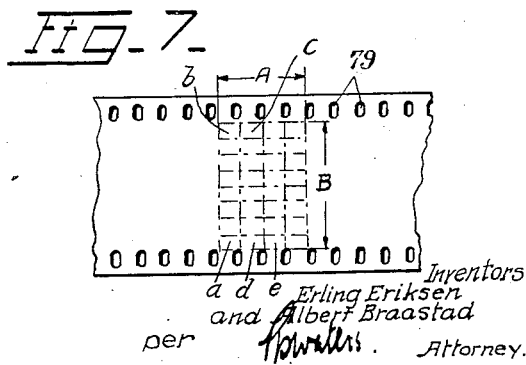
Inventors
Erling Eriksen
and Albert Braastad
per  Powells. Attorney.

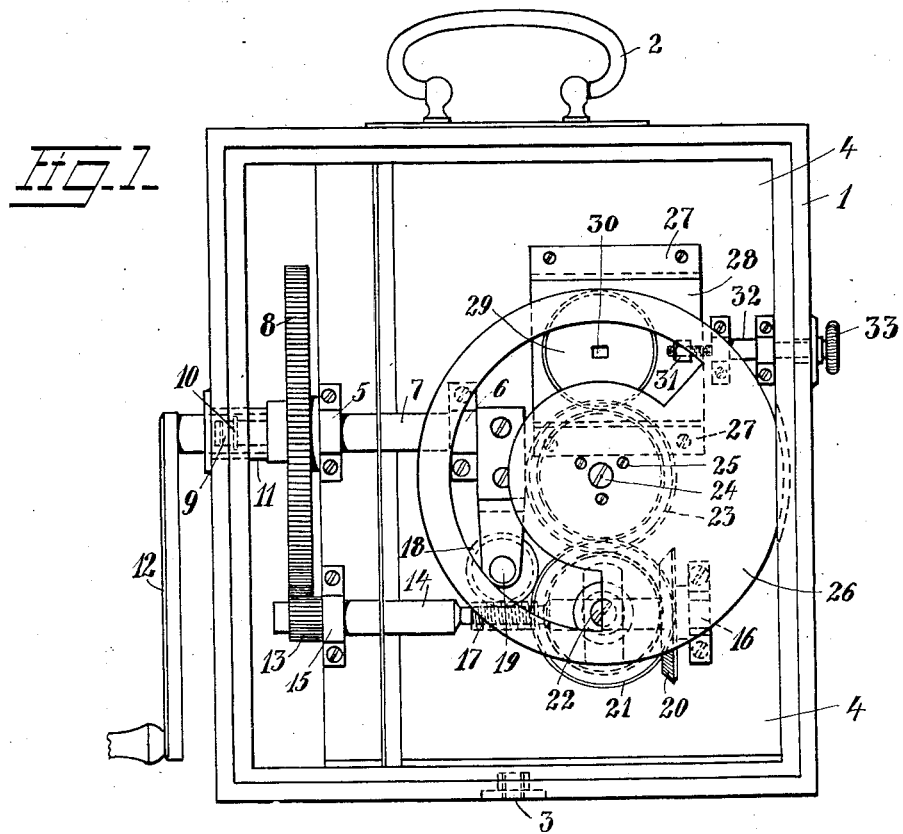

Patented May 14, 1929.

1,713,220

UNITED STATES PATENT OFFICE.

ERLING ERIKSEN AND ALBERT BRAASTAD, OF OSLO, NORWAY.

PLURAL-ROW CINEMATOGRAPHIC CAMERA.

Application filed October 1, 1924. Serial No. 740,936.

The present invention relates to apparatus for exposure of cinematographic films, and the main object of the invention is to provide means whereby a greater number of element pictures may be exposed on a given area of the film than hitherto possible.

Hitherto the film has been exposed in such way that each elemental picture required the entire picture width of the film. In order to decrease the amount of film used and accordingly also the costs for further treatment of the same, it has previously been suggested to use narrow films. However, if such narrow films shall be of so little width as to materially decrease the expenses mentioned above, the film will become too weak to be produced, exposed and treated in the usual way.

These drawbacks are removed by the present invention, by means of which a film of usual width and strength is used, but several element pictures are exposed in more than one series on the film.

The annexed drawings show, by way of example, one form of apparatus embodying our invention.

Fig. 1 shows a front view of the apparatus, the front wall of the housing being removed.

Fig. 2 is a plan view thereof, the top wall being removed.

Fig. 3 is a rear view thereof, the rear wall being removed.

Fig. 4 shows at a larger scale the cam disc which causes the lateral displacement of the film.

Fig. 5 is an enlarged view, partly in section, of the feeding means and stop means for the film.

Fig. 6 is a section taken along the line VI—VI in Fig. 3, showing the guiding means for the film.

Fig. 7 shows a piece of a film of usual type, dash and dot lines thereon indicating how the several pictures may be exposed thereon by means of our apparatus.

According to our invention we provide, in an apparatus for exposing cinematographic films, means which displace the film sideways or laterally, in such manner that more than one row or series of pictures are obtained over the width of the film, each picture in each row or series also having such extension in the longitudinal direction of the film, that several rows or series of pictures may be exposed on the same area, which has been previously used for one picture only.

Fig. 7 shows a piece of a usual film, on which pictures may be exposed, according to the usual method, of a width B and of a length A. Exposing such film by the apparatus described in detail below we obtain on an area A by B four series of pictures, each series containing eight pictures taken in the width direction of the film. Thus thirty-two elemental pictures are obtained on an area previously necessary for one element picture only, whereby an immense saving is obtained in expenses for film and in labour and costs for the further treatment thereof.

As indicated in Fig. 7 the element pictures are so placed that their longer sides lie in the longitudinal direction of the film, but we may as well provide means whereby the longer side will come in the width direction of the film.

The elemental pictures are preferably exposed in such succession that the exposure starts at one side of the film, say at a Fig. 7, the row a—b there being exposed one picture at a time, whereupon the film is fed one step longitudinally and the element picture c is exposed; then follows successive exposure of each elemental picture in the row c—d, whereupon the film is fed one step longitudinally to e and the next series is exposed and so on.

Referring now to the Figs. 1–3, the mechanism is situated within a box or casing 1, having a handle 2 for the transport thereof and a nut 3 or the like, by means of which the box may be secured on a stand (not shown). Within the box is a partition 4 to which is secured bearings 5 and 6, in which is journalled a shaft 7 carrying, keyed thereto, a gear 8. One end 9 of the shaft 7 goes through one side wall of the box 1 and extends into a sleeve 11, which is secured in the said side wall. A pin 10 is passed through the said end 9. The other end of the sleeve 11 bears against the hub of the gear 8 or fits into an annular groove therein, whereby a light proof connection is obtained. The shaft 7 may be rotated by means of a handle 12. The gear 8 meshes with and drives a gear 13 secured to a shaft 14 journalled in bearings 15 and 16. Keyed to the shaft 14, or formed thereon, is a worm 17 meshing with a worm gear 18 secured to a shaft 19, that extends through the partition 4. To the shaft 14 is also keyed a bevelled gear 20 meshing with a bevelled gear 21 rotatably mounted on a stud 22. The gear 21 also meshes with a gear 23, which is rotatable on a stud 24 and to which gear is secured a rotating shutter 26, by means of screws 25 or the like.

To the partition 4 are also secured guiding lists 27, between which moves a plate 28 carrying a cylindric sleeve 29, which affords room for the lens (not shown). In the inner closed end of the sleeve there is arranged an opening 30, the area of which corresponds to the area of each elemental picture to be exposed. The plate 28 carries a nut 31 within which is placed a screw 32 penetrating through one side wall of the box 1, the outer end of the said screw carrying a knurled head 33. By turning the head 33, the plate 28 and thus also the sleeve 29 and the opening 30, may be adjusted as to its position in lateral direction.

On the rear end (shown in Fig. 3) of the shaft 19 is secured a cam disc 34, which through a roller 35 acts upon a frame 36, movable up and down in a vertical direction. At each corner of the frame 36 there is, rotatably secured thereto, a guiding roller 37 having V-shaped peripheries, which rollers run on correspondingly V-shaped guiding lists 38 secured to the partition 4. The said guiding lists may be interconnected by means of adjustable connecting means, for instance screws 39, as shown. A spring 40 acts to press the roller 35 of the frame 36 against the periphery of the cam disc 34. In the frame 36 there is arranged a longitudinal groove, the width of which corresponds with the width of the picture surface of the film 41 (Fig. 6). The said groove acts to guide the film, and on the bottom of the groove there is placed a layer 42 of suitable soft material, for instance velvet or the like. In the said layer 42 and in the bottom of the groove, there is provided a vertical slot 43, into which extends a hollow extension 44 of the lens sleeve 29. The said hollow extension has an inner, open area of such size as will correspond with each elemental area of the film to be exposed at a time. In front of the slot 43 there is a plate 45, pivotally secured to the frame 36. At the free end such plate is normally held against the frame 36, by means of a spring actuated snap 46. At the inner side of the plate 45 there is arranged another plate 47 secured to the plate 45 by means of screws 48. The plate 47 is also covered by a layer of soft material, for instance velvet. Between the plates 45 and 47 there are arranged plate springs 49, tending to press the said plates away from each other. In each of the plates 45 and 47 there is provided a vertical slot 50, lying in front of the slot 43 mentioned above. When the plate 45 is held by the snap 46, the plate 47 will, by means of the springs 49, act to press the film 41 against the bottom of the groove, in close relation to the opening 30 in the sleeve 29 or the extension 44 thereof.

At each end of the frame 36 are situated film housings 51 and 52 respectively, having lugs 53 and 54 respectively, which enter into correspondingly shaped grooves or openings in the end portions of the frame, thereby demountably securing the housings to the frame. One end of each housing is provided with a cover 51$^a$, demountably secured by means of lugs entering into L-shaped grooves. The film passes into or out from the housings through slots, and the housings are also held in position by means of spring clips, 55 and 56 respectively, secured to the frame.

For feeding of the film, in the longitudinal direction thereof, there is provided a rotatable feeding drum 59, mounted transversely to the frame 36 in bearings 57 and 58. The feeding drum carries, as usual, teeth 60 which engage perforations 79 at the edges of the film. The lower end of the feeding drum carries two gears 61 and 62 respectively (Fig. 5), which at predetermined moments are actuated by teeth 63, 64 formed upon the rear side of the cam disc 34, in such way that the drum 59 is rotated through a certain distance and thereby feeds the film one step longitudinally. The gears 61 and 62 are so mounted in relation to each other, that each tooth on the one gear is situated in front of the opening between two teeth on the other gear, whereby it is obtained that one of the said gears when at rest, has one tooth directed normally to the cam disc 34. The lower toothed portion of the drum 59 is also provided with a series of notches 65, coacting with a stop pawl 66 secured to the bearing 58. The pawl takes the shape of a lever, the lower end 66' of which is acted upon by the top end of another lever 67, the lower end of which is provided with two extensions or abutments 68 and 69. The said abutments are adapted to coact with pins 70 and 71 respectively, on the cam disc 34, in such manner that when the pin in question moves the lower end of the lever 67 towards right (in Fig. 5) the top end of the said lever will press against the lower end 66$^1$ of the lever 66 thus causing the pawl to release the drum 59. Over the two levers 66, 67 lies a double acting spring 72, one end of which presses the pawl 66 towards the drum 59 whereas the other end presses the lower end of the lever 67 towards a fixed abutment 73.

The cam disc 34 is shown in detail in Fig. 4. On each side of a center line $x$—$x$ the curvatures of the periphery are similar to each other. Only the part on one side of the said line need therefore to be described. As will be seen from the drawing the periphery is shaped to form a series of cams $74^1$—$74^8$, eight such cams being shown in the present case. The number of such cams will however vary according to the number of elemental pictures, which it is desired to expose in each transverse series of elemental pictures on the film. The difference between the radii of the two cams $74^1$ and $74^8$ corresponds with the distance through which the film is to be moved sideways when one of the series of element pictures is to be exposed. The central angle covered by each cam is equal for all of the cams, and thus the length of each cam surface is decreasing from the cam $74^1$ to the cam $74^8$ in proportionality with the distance of each cam from the axis of the shaft 19, which rotates the cam disc 34. Thus the period of exposure will become fully equal for all the element pictures of the several series.

The apparatus described operates in the following manner:

Turning of the handle 12 causes through the gears 8 and 13 the shaft 14 to be rotated. The shaft 14 drives through the gears 20, 21, 23 the rotating shutter 26, with a speed corresponding with the sideways translation of the film 41. At the same time the shaft 14 drives, through the screw 17 and screw wheel 18 and the shaft 19, the cam disc 34. The periphery of the cam disc acts upon the roller 35 to raise the frame 36 and thereby also the film 41. When the film thus has reached its uppermost position, the cam disc 34 will be in such position that the roller 35 passes on to one of the cams $74^1$, at which time the lowermost element picture of a series (say $e$ Fig. 7) is exposed. The cam disc 34 rotates further and when the roller 35 passes over from the first of the cams $74^1$ to the adjacent cam $74^1$, the pin 71 abuts against the abutment 69 thus releasing the pawl 66 from engagement with a notch 65. At this time the tooth 64 acts upon the gear 62 to move the same one step, whereby the film is fed longitudinally to such an extent that the picture surface $d$ (Fig. 7) is placed in line with the opening 30, and the picture is exposed. Then the roller 35 passes over to the cam $74^2$, and the spring 40, coacting with the weight of the frame arrangement, acts to lower the frame for exposing of the second picture in the series $d$—$c$ etc. When the film has reached its lowermost position the roller 35 goes on to the first of the cams $74^8$ and the uppermost element picture of the row in question is exposed. At the time when the roller 35 is passing over from the first of the cams $74^8$ to the adjacent cam $74^8$, the pin 70 abuts against the abutment 68 and releases the pawl 66, and the tooth 63 on the cam disc acts to move the gear 61 one step, thus feeding the film one step in longitudinal direction. The shutter 26 is rotated at such speed that it covers the opening 30 during each longitudinal and each sideways feed of the film.

In order to roll up the exposed film 41 in the housing 52, there is arranged a core 75 the end of which extends through the cover of the housing and carries a pulley 76. On the top of the drum 59 there is arranged another pulley 77 of greater diameter than the first mentioned one. Over these pulleys runs an endless connection means 78, which preferably takes the form of a screw wound spring, the ends of which are secured to each other in such manner that a loop is formed. Thus the drum 59 will roll up the film on the core 75 and at the same time cause the longitudinal feeding of the film to take place.

As will be understood the apparatus here described in detail is only one of the several forms which an apparatus according to our invention may take.

The apparatus described may also be used for projection purposes, if a source of light (not shown) is placed at the rear to the apparatus in a suitable way, and a shutter and, eventually, lens suitable for projection are inserted in lieu of those used for exposing purposes.

Having now particularly described and ascertained the nature of our said invention, and in what manner the same is to be performed, we declare that what we claim is:

1. An apparatus for the exposure of a plurality of series of pictures on a cinematographic film comprising a guide frame for guiding the film laterally, a film housing secured at each end of the frame, feeding means for intermittently feeding the film from one of the housings to the other, a cam contacting with the frame intermittently imparting lateral reciprocating movement thereto, and means whereby said feeding means is actuated by said cam to give said film a longitudinal movement only.

2. An apparatus for the exposure of a plurality of series of pictures on a cinematographic film comprising a guide frame for guiding the film laterally, a film housing secured at each end of the frame, a feeding drum mounted transversely of said frame and having gears arranged at the end thereof, a cam contacting with the frame intermittently imparting lateral reciprocating motion thereto and provided with teeth which intermittently mesh with said gears for feeding the film in longitudinal direction only.

3. An apparatus as claimed in claim 2 in which the feeding drum is provided with a stop mechanism for preventing longitudinal movement of the film during said lateral movement of the frame.

In testimony whereof we have signed our names to this specification.

ERLING ERIKSEN.
ALBERT BRAASTAD.